Oct. 8, 1940.                    J. F. LUHRS                     2,217,638
                       MEASURING AND CONTROLLING APPARATUS
                            Filed July 9, 1937            5 Sheets-Sheet 1

Inventor
JOHN F. LUHRS
By Raymond W. Junkins
Attorney

Oct. 8, 1940.  J. F. LUHRS  2,217,638
MEASURING AND CONTROLLING APPARATUS
Filed July 9, 1937   5 Sheets-Sheet 3

Inventor
JOHN F. LUHRS
By
Raymond W. Junkins
Attorney

Patented Oct. 8, 1940

2,217,638

UNITED STATES PATENT OFFICE 2,217,638

MEASURING AND CONTROLLING APPARATUS

John F. Luhrs, Cleveland Heights, Ohio, assignor to Bailey Meter Company, a corporation of Delaware Application July 9, 1937, Serial No. 152,856

16 Claims. (Cl. 122—448)

This invention relates to the art of measuring and/or controlling the magnitude of a variable quantity, condition, relation, etc., and particularly such a variable condition as the density of a liquid-vapor mixture, although the variable might be temperature, pressure, or any physical, chemical, electrical, hydraulic, thermal, or other characteristic.

I have chosen to illustrate and describe as a preferred embodiment of my invention its adaptation to the measuring and controlling of the density and other characteristics of a flowing heated fluid stream, such as the flow of hydrocarbon oil through a cracking still.

While a partially satisfactory control of the cracking operation may be had from a knowledge of the temperature, pressure and rate of flow of the fluid stream being treated, yet a knowledge of the density of the flowing stream at different points in its path is of considerably greater value to the operator.

In the treatment of water below the critical pressure, as in a vapor generator, a knowledge of temperature, pressure and rate of flow may be sufficient for proper control, inasmuch as definite tables have been established for interrelation between temperature and pressure and from which tables the density of the liquid or vapor may be determined. However, there are no available tables for mixtures of liquid and vapor.

In the processing of a fluid, such as a petroleum hydrocarbon, a change in density of the fluid may occur through at least three causes:

1. The generation or formation of vapor of the liquid, whether or not separation from the liquid occurs.
2. Liberation of dissolved or entrained gases.
3. Molecular rearrangement as by cracking or polymerization.

The result is that no temperature-pressure-density tables may be established for any liquid, vapor, or liquid-vapor condition of such a fluid, and it is only through actual measurement of the density of a mixture of the liquid and vapor that the operator may have any reliable knowledge as to the physical condition of the fluid stream at various points in its treatment.

It will be readily apparent to those skilled in the art that the continuous determination of the density of such a flowing stream is of tremendous importance and value to an operator in controlling the heating, mean density, time of detention and/or treatment in a given portion of the circuit, etc. A continuous knowledge of the density of such a heated flowing stream is particularly advantageous where wide changes in density occur due to formation, generation, and/or liberation of gases, with a resulting formation of liquid-vapor mixtures, velocity changes, and varying time of detention in different portions of the fluid path. In fact, for a fixed or given volume of path, a determination of mean density in that portion provides a possibility of accurately determining the time that the fluid in that portion of the path is subjected to heating or treatment. By my invention I provide the requisite system and apparatus wherein such information is made available continuously to an operator, and furthermore comprises the guiding means for automatic control of the process or treatment.

While illustrating and describing my invention as preferably adapted to the cracking of petroleum hydrocarbon, it is to be understood that it may be equally adaptable to the vaporization or treatment of other fluids and in other processes.

Figure 1:
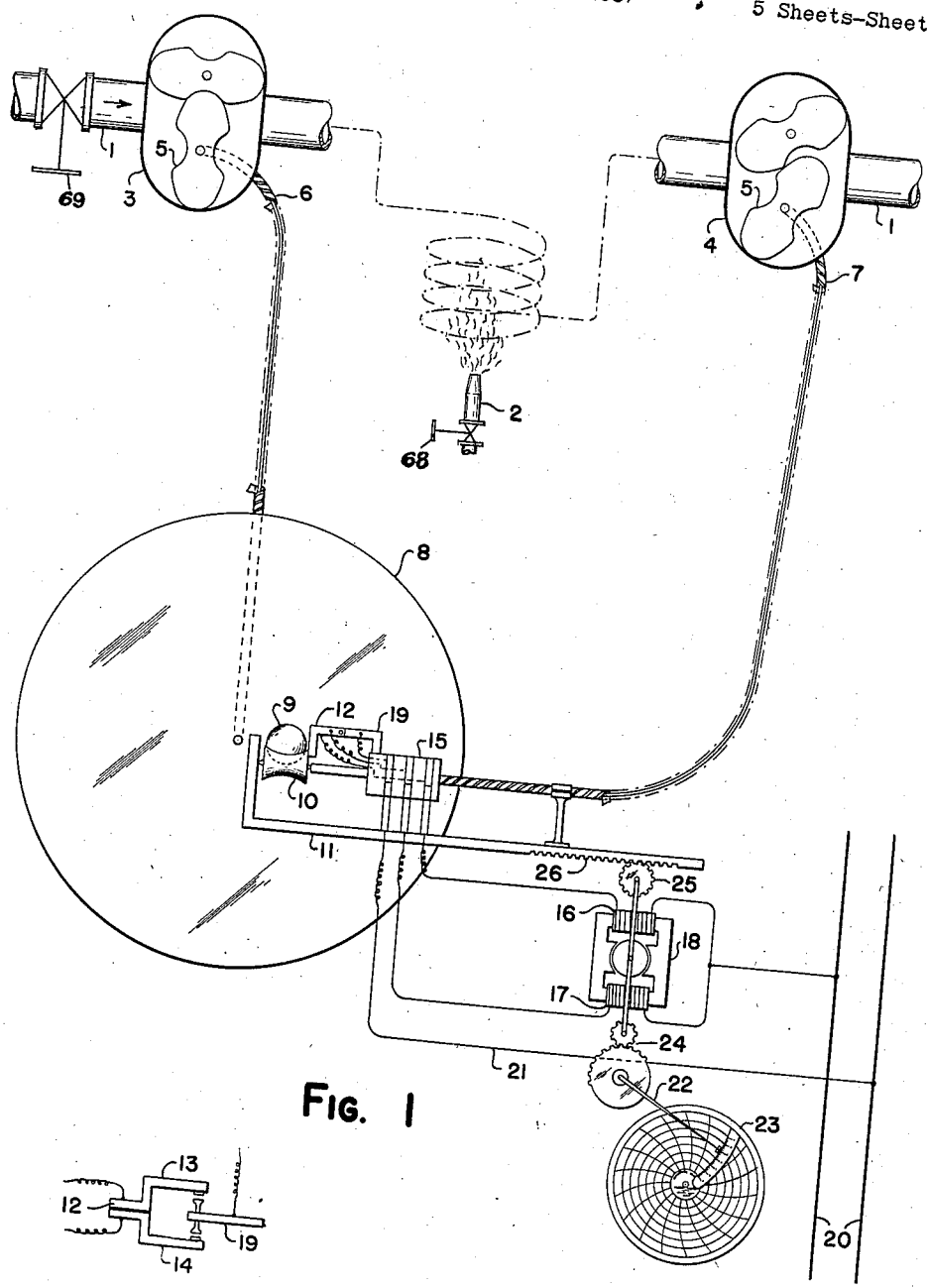
Fig. 1 is a diagrammatic representation of density measuring apparatus for a heated fluid stream.

Referring now in particular to Fig. 1, I indicate a conduit 1 which may be considered as comprising the once through fluid path of an oil still wherein a portion of the path is heated as by a burner 2. The rate of flow of the charge or relatively untreated hydrocarbon is continuously measured by a volumetric type of flow meter 3, while a similar volumetric flow meter 4 is located with reference to the conduit 1 beyond the heating means or after the flowing fluid has been subjected to heating or to other treatment or processing.

A control valve 69 is located in the conduit 1 whereby the rate of flow of the fluid may be regulated. A control valve 68 located in the burner line 2 allows adjustment of the firing and consequently of the heating.

As known, the total volume of fluid passing through a conduit in a given length of time is conveniently and accurately measured by positive displacement meters which have as a primary element a chamber or chambers through which the fluid passes in successive isolated quantities or volumes. These quantities may be separated from the stream and isolated by alternate filling and emptying of containers of known capacity, and fluid cannot pass through without actuating the primary device. The secondary element of such a meter usually is a counter with suitably graduated dials for indicating the total quantity that has passed through the meter up to the time of reading. In the present invention, however, the rotatable shaft which normally actuates such a counter is adapted to drive or position the mechanism which functions to determine density of the fluid.

The primary elements 3 and 4 which are inserted in the conduit 1 each have complementary rotatable members 5 which are mounted for rotation upon shaft centers in such a manner as to be in sealing contact with the inner wall of the meter casing and with each other. Thus, an effective seal is provided across the conduit 1 at device 3 and at device 4. However, inasmuch as the elements 5 are rotatable, pressure of the fluid at the entrance to the device 3 causes rotation of the elements 5 therein, which causes the passage of definite trapped portions of fluid through the device 3 from the inlet to the outlet. The operation of the device 4 is similar.

The speed of a flexible shaft 6 leaving the primary element 3 varies directly with rate of fluid flow, directly with variations in specific volume of the fluid, and inversely with variations in density of the fluid. The same is true of the speed of a shaft 7 leaving the primary element 4 in regard to the fluid flowing therethrough.

By interrelating or comparing the speed of the shafts 6, 7 I may determine the relative density between the two locations, or for example compare the density of the fluid before the heating means 2 with its density at a location after the heating means. This comparison will allow me to ascertain the change in specific volume or density, due to the treatment or heating by the means 2, as well as to ascertain an indication of the heat change in the fluid.

While I have stated that the speed of the shaft 6 as well as the speed of the shaft 7 will individually vary with rate of flow of the fluid, still if I am making a comparison of the speed of the shafts 6, 7 where the same fluid passes successively through the meters 3, 4, then variations in rate of flow will have no more effect upon the one shaft speed than upon the other shaft speed, and may therefore be disregarded entirely. Thus the speed of the shafts 6, 7 will vary with variations in specific volume or density at the individual meters 3, 4.

As previously stated, for the example illustrated in Fig. 1, I consider that the fluid entering the meter 3 is the charge or relatively untreated hydrocarbon to the furnace, and at a substantially uniform specific gravity or density. Such may be determined periodically if desired to ascertain whether it has in fact departed from the design condition for which the meter 3 and shaft 6 are calibrated. Assuming then for the moment that the specific gravity or density of the fluid in the conduit 1 entering the meter 3 remains constant, then the density of the fluid passing through the meter 4 may be determined as follows:

$$d_4 = d_3 \frac{S_3}{S_4} \qquad (1)$$

where $d_3$ = density of fluid passing through meter 3
$d_4$ = density of fluid passing through meter 4
$S_3$ = speed of shaft 6 of meter 3
$S_4$ = speed of shaft 7 of meter 4

This is, of course, predicated upon the fact that the meters 3 and 4 are of the same size and design so that if the same volume rate of fluid at the same density conditions is passing through the two, then the speeds of the shafts 6, 7 are the same.

Figure 2:
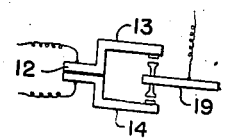
Fig. 2 is a detail of the mechanism illustrated in Fig. 1.

As a practical means of mechanically solving the Formula 1 to determine the density of the fluid passing through the meter 4, I will now describe in detail the showing of Figs. 1 and 2.

A disk 8 is adapted to be rotated by the displacement meter 3 through the shaft 6. Frictionally engaging the disk 8 is a sphere or ball 9 likewise frictionally engaging a rotatable spool 10 supported by a carriage 11. The spool 10 is provided with an arm 12 as shown in Fig. 2 carrying a pair of contacts 13 and 14 connected through suitable slip rings in a drum 15 supported by carriage 11 to opposed fields 16 and 17 respectively of a motor 18.

The drum 15 is rotated by the meter 4 through the agency of the shaft 7 and carries a contact 19 cooperating with the contacts 13, 14. The contact 19 is connected through a slip ring in the drum 15 directly to the power source 20 through a conductor 21. The arrangement is such that upon engagement of the contact 19 with the contact 13 the field 16 is energized and conversely upon engagement of the contact 19 with the contact 14 the field 17 is energized. The motor 18 is adapted to drive an indicating-recording pen arm 22 relative to a chart 23 through gears 24 and in unison therewith the carriage 11 through a gear 25 meshing with a suitable rack 26 carried in the carriage 11.

In operation, assuming the system to be in equilibrium, the contacts 13, 14 will be rotated at synchronous speed with the contact 19 so that the fields 16, 17 of the motor 18 are de-energized. Upon an increase in the rate of firing through the burner 2 with a corresponding increase in specific volume and conversely a decrease in density of the fluid passing through the meter 4, the speed of the shaft 7 will increase relative to the speed of the shaft 6. Thus the rotative speed of the drum 15 and of the contact 19 will increase relative to the rotative speed of the disk 8, the spool 10 and the contacts 13, 14. The arrangement is such that the contact 19 will engage the contact 13, causing energization of the field 16 and rotation of the motor 18 in proper direction to move the carriage 11 to the right on the drawing, whereby the radius of contact of the sphere 9 with the disk 8 relative to the center of the disk 8 will be increased, and thereby the speed of rotation of the spool 10 and contacts 13, 14 will be increased relative to what it was previously, and such action will continue until the rotative speed of the contacts 13, 14 and the contact 19 is in synchronism and the contact 19 is not close circuited with either the contact 13 or the contact 14, whereafter rotation of the motor 18 will cease. The position of the carriage 11 and correspondingly (through the gear 24) of the indicator 22 relative to the chart 23 is indicative of the density of the fluid passing through the meter 4. This may be seen from the following:

Angular travel of 12= ∠ travel of 6 × radius
Angular travel of 19= ∠ travel of 7
  But in equilibrium—
Angular travel of 12=Angular travel of 19
  Therefore—
    ∠ travel of 6 × radius= ∠ travel of 7

$$R = \frac{\angle \text{ travel of 7}}{\angle \text{ travel of 6}} \quad (2)$$

and—
When ∠ travel 6=0   $R=\infty$
When ∠ travel 7=0   $R=0$

Thus the radial distance from the center of the disk 8 to the point of contact of the sphere 9 with the disk 8, is a measure of the ratio of the speeds of the shafts 6, 7 and knowing the density of the fluid passing through the meter 3, the said radius is a measure of the density of the fluid passing through the meter 4. The value of the density of the fluid passing through the meter 4 is indicated and recorded relative to the chart 23 by the positioning of the pointer 22 through the agency of the motor 18.

From an observation of the value of density indicated and recorded relative to the chart 23, I may so adjust the valve 68 and/or the valve 69 that optimum operating, treating, or processing may be attained.

Figure 3:
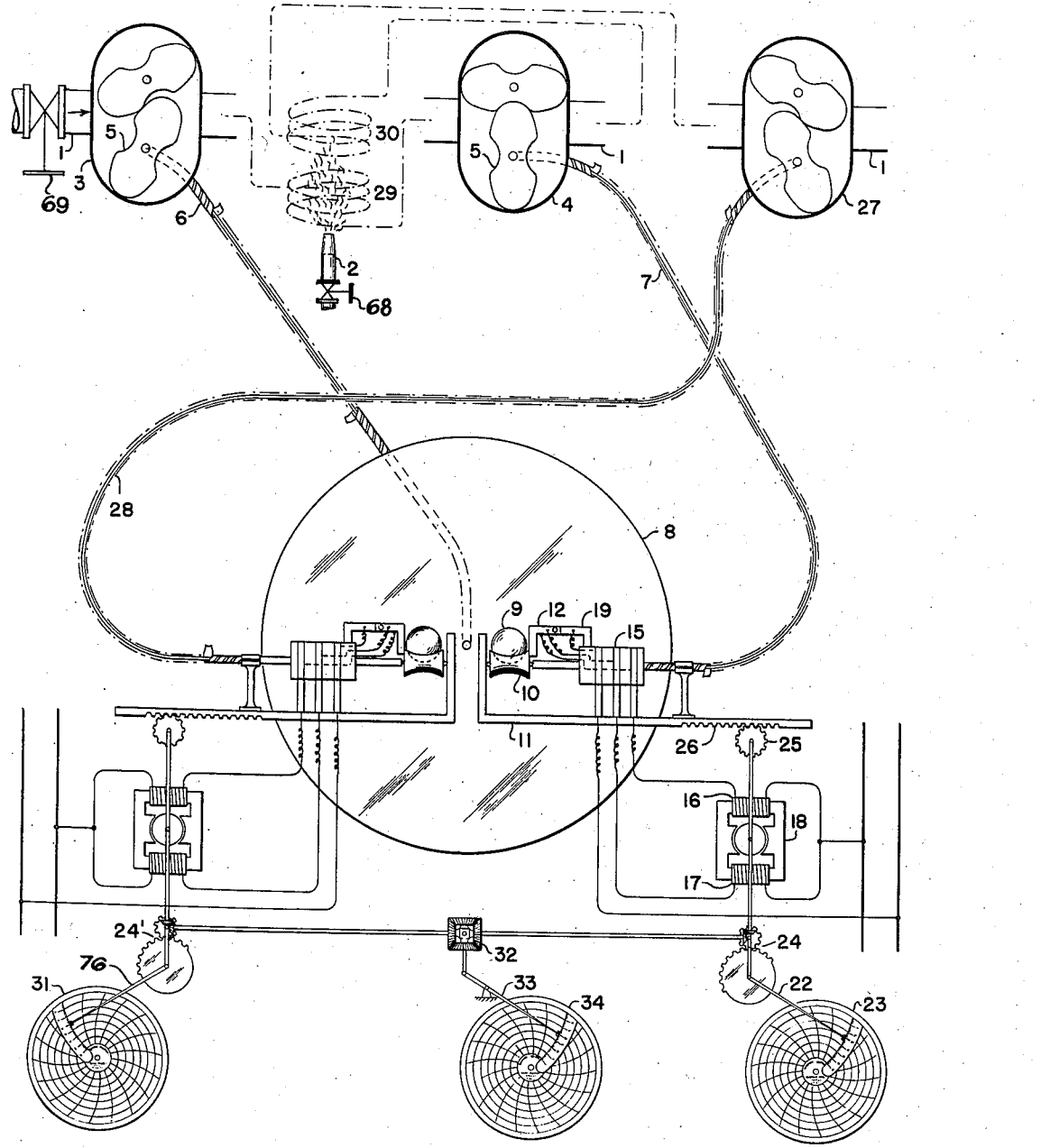
Fig. 3 is a diagrammatic arrangement of the invention in connection with a heated fluid stream wherein mean density of the fluid in a portion of the path is determined.

Referring now to Fig. 3 wherein like parts bear the same reference numerals as in Figs. 1 and 2, I indicate that after the fluid is passed through the meter 4 it is returned to a further heating section of the still, from which it passes through a third displacement type meter 27 having an output shaft 28. The heating coil 29 will be hereinafter referred to as a first heating section, while the coil 30 will be referred to as a second heating section. In the preferred arrangement and operation of the still the section 30 is the conversion or cracking section and the one in which it is primarily desirable to continuously determine the mean density of the fluid, as well as its time of detention or treatment. For that reason I now desirably determine the mean density of the fluid in the section 30 and accomplish this through an interrelation of the speeds of the meters 3, 4, 27 produced by the same weight flow passing successively through the meters.

The same total weight of fluid must pass through the three meters in succession so long as there is no addition to or diversion from the path intermediate the meters. It is equally apparent that in the heating of a petroleum hydrocarbon as by the coil 29 between the meters 3 and 4, there will be a change in density of the fluid between the two meters, and furthermore that an additional heating of the fluid as by the coil 30 will further vary the density of the fluid as at the meter 27 relative to the meter 4.

Assume now that the conduit 1 is of a uniform size throughout and that the meters 3, 4, 27 are of the same size as well as coefficient or characteristic. The mean density of the fluid in the conversion section 30 is then obtained by averaging the density of the fluid passing through the meters 4 and 27. As for example:

$$md_{30} = \frac{d_4 + d_{27}}{2} \quad (3)$$

The density of the fluid passing through the meter 27 may be obtained in the same manner relative to the density of the fluid passing through the meter 3 as was previously determined for the density of the fluid passing through the meter 4. Then simplifying this into a single operation I have:

$$md_{30} = \frac{d_3 \frac{S_2}{S_4} + d_2 \frac{S_3}{S_{27}}}{2}$$

$$= d_3 \frac{\frac{S_2}{S_4} + \frac{S_3}{S_{27}}}{2} \quad (4)$$

Thus the mean density of the fluid in the conversion section 30 (knowing the density or specific gravity of the fluid entering the system) may be directly computed from the speeds of the shafts 6, 7, 28.

In Fig. 3 I have shown mechanism similar to that of Figs. 1 and 2, whereby density of the fluid passing through the meter 4 is continuously indicated relative to the chart 23, while through a duplication of some of the parts cooperating with the disk 8 I continuously indicate the density of the fluid passing through the meter 27 upon the chart 31. The arrangement illustrated wherein the two sets of mechanisms operate relative to the disk 8 at varying radii from the center of the disk 8 is feasible, for it is not expected that either of the two mechanisms would ever have to go to a zero radius or that the speed of the disk 8 would ever go to zero. At no time when the system is operating can there be zero flow through one of the meters.

Certain features of the mechanism disclosed in Figs. 1, 2 and 3 are disclosed and claimed in the copending application of Clarence Johnson Ser. No. 307,103.

With the density at the meter 4 indicated on the chart 23, and that at meter 27 on the chart 31, I obtain the mean density through the conversion section 30 through Formula 4 by averaging the positions of the gearing 24, 24' by means of a differential mechanism 32 which positions a pointer 33 relative to a chart 34 directly in terms of mean density $md_{30}$.

From an observation of the value of density at the meter 4, or at the meter 27, or of the mean density through the conversion section 30, I may so adjust the valve 68 and/or the valve 69 that optimum operating, treating, or processing may be attained.

Figure 4:
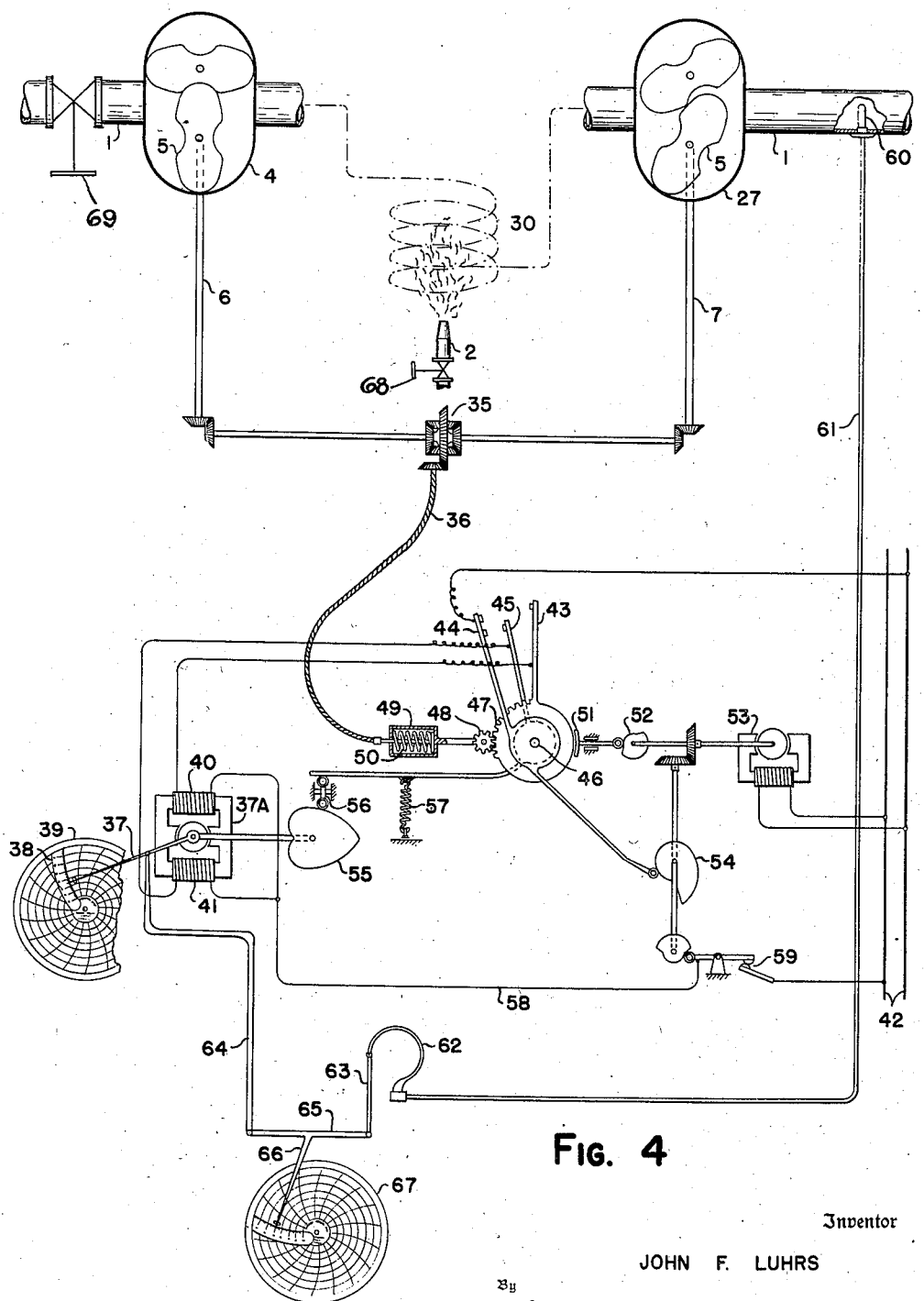
Fig. 4 is a diagrammatic illustration of an embodiment of my invention wherein the time of detention as well as time-temperature relation is determined.

In Fig. 4 I illustrate a somewhat different arrangement whereby I am enabled to utilize the speed of the meters 4, 27 to determine the velocity and/or time of detention of the fluid within the heating portion 30, and may also determine the time-temperature relation of the conversion section of the still.

With the same fluid flowing successively through the meters 4, 27 the speeds of the shafts 6, 7 will vary only with variations in specific volume or density of the fluid. However, the average speed of the shafts 6, 7 will vary as the rate of flow through the section 30 in cubic feet per unit of time. Thus the average speed becomes directly proportional to a measure of time of detention or velocity.

To embody this portion of my invention in workable fashion I apply the angular movement of the shafts 6, 7 to an averaging gearing 35, from which a flexible shaft 36 is rotated at a speed the average of the speed of shafts 6 and 7. To indicate or record such average speed an arm 37 is positioned by a motor 37A relative to an index 38 and a recording chart 39. The reversible motor 37A has opposed fields 40, 41 adapted to be energized from a suitable source 42.

Energization of the field 40 for positioning the indicator 37 in one direction is effected through engagement of a contact arm 43 with a contact structure 44; and energization of the field 41 for positioning of the indicator 37 in opposite direction is effected through engagement of a contact arm 45 with the contact structure 44. When the fields 40 and 41 are simultaneously energized or deenergized the motor 37A is not urged to rotation.

The contact arm 43 is rotatably mounted on a fixed shaft 46 and is provided with a toothed hub 47 meshing with a pinion 48 driven by an extension of the flexible shaft 36. The pinion 48 is shown as being driven by the shaft 36 through a friction means 49 wherein the shaft 36 is actually broken by the two parts held in frictional engagement by means of a spring 50, to the end that if the part of the shaft 36 connected to the pinion 48 is locked or held against rotation the friction means will slip, allowing the gearing 35 to continue to rotate the shaft 36.

The arm 43 is periodically locked and held against rotation by means of a brake member 51 intermittently urged against the hub 47 by a cam 52 rotated by a constant speed motor 53. The arrangement is such that the contact arm 43 is periodically, for constant increments of time, allowed to advance from an initial position in a counterclockwise direction, as shown in the drawing, and then locked against rotation by the shaft 36 through the agency of the brake member 51. As the contact arm 43 is advanced by the shaft 36 the periodic displacement from the initial position will be proportional to the speed of the shaft 36.

Subsequent to each advancement the contact arm 43 is returned to the initial position against the action of the brake member 51 by the contact structure 44 rotatably mounted on the shaft 46 and periodically oscillated by a cam 54 rotated by the motor 53. Upon engagement of the contact structure 44 with the contact arm 43 the field 40 will be energized to position the indicator 37 in one direction. Accordingly, so much of the apparatus as has been described will function to periodically position the pointer 37 in one direction by increments bearing a functional relation to the speed of the shaft 36. Such positioning of the pointer 37 may be in direct proportion to the average speed of the meters 4, 27 or to the velocity or time of detention of the fluid flowing through the section 30. If desired, a functional relation may be embodied through proper shaping of the cam 54, as will be understood by those familiar with the art.

The contact arm 45 is rotatably mounted on the shaft 46 and adapted to be positioned by a cam 55 through a follower 56. The cam 55 is operated in unison with the indicator 37 by the motor 37A, and accordingly the contact arm 45 assumes a position in accordance with the position of the indicator 37. As the arm 45 is periodically moved by the contact structure 44 in returning the arm 43 to the initial position it is yieldably urged against the follower 56 and cam 55 by a spring 57.

Engagement of the contact structure 44 with the arm 45 effects energization of the field 41 to position the indicator 37 in opposite direction to that caused by energization of the field 40. The contact structure 44 in periodically advancing to return the arms 43 and 45 to their initial position in effect compares the actual rate of speed of the shaft 36 to that speed indicated or exhibited by the arm 37; and if the former has changed between such periodic advances, corrects the latter until they are again in agreement. So long as such agreement exists, no change is made in the position of the arm 37.

The operation of the apparatus is cyclic and, assuming the parts to be in the position shown in Fig. 4, the contact arm 43 will advance from the initial position in which it is shown for an increment of time determined by the shape of the cam 52, which at the termination of the increment will urge the brake member 51 against the hub 47. During the advance of the contact arm 43 the contact structure 44 will remain stationary due to the shape of the cam 54. Likewise the contact arm 45 will remain stationary as the fields 40 and 41 of the motor 37A are both deenergized. Immediately subsequent to the advance of the contact arm 43 from the initial position the contact structure 44 will be rotated in a clockwise direction by the cam 54. Upon the contact structure 44 engaging the contact arm 45 the field 41 of the motor 37A will be energized tending to position the indicator 37 in one direction. Likewise, upon the contact structure 44 engaging the contact arm 43 the field 40 will be energized tending to position the pointer 37 in opposite direction.

If the contact structure 44 engages the contact arms 43, 45 simultaneously the indicator 37 will remain stationary. If the contact arm 43 in its incremental advance is displaced beyond the contact arm 45, indicating that the actual speed of the shaft 36 is greater than that indicated by the pointer 37, engagement will take place between the contact structure 44 and contact arm 43 effecting energization of the field 40 and operating the pointer 37 to indicate an increase in speed. Simultaneously the contact arm 45 will be positioned in proportion to the movement of the arm 37 in a counterclockwise direction through the cam 55 and follower 56. Positioning of the pointer 37 will continue until the contact structure 44 engages the contact arm 45, when both fields will be equally energized and the motor 37A not urged to rotation. Conversely, upon the speed of the shaft 36 decreasing, the contact arm 43 will not advance to a position coincident with that of the contact arm 45, and accordingly the contact structure 44 will engage the contact arm 45 before engaging the contact arm 43. Such engagement will effect energization of the field 41 positioning the pointer 37 in a direction to indicate a decrease in the speed of the shaft 36 and simultaneously positioning the contact arm 43 in a clockwise direction. Such positioning will continue until the contact structure 44 engages the contact arm 43, when both fields will become energized. Such incremental positioning of the arm 37 will continue during each cycle of operation until upon advancing the contact structure 44 simultaneously engages the contacts 43 and 45. The apparatus, therefore, functions to compare the actual speed of the shaft 36, as indicated by the angular position of the contact arm 43 at the termination of its incremental advance with the speed shown by the indicator 37; and then to periodically adjust the position of the arm 37 by increments proportional to the difference in angular position of the contact arms 43 and 45 until the showing of the indicator 37 agrees with the actual speed of the shaft 36.

After the contact structure 44 has returned the contact arm 43 to the initial position the shape of cam 54 permits the quick return of the contact structure 44 to the position shown in Fig. 4, thereby effecting substantially simultaneous deenergization of the fields 40 and 41. The contact arm 45 follows the contact structure 44 in its quick return however until again engaging the cam follower 56. To avoid the possibility of a continuing energization of the field 41, effecting a positioning of the arm 37, I show the fields 40 and 41 connected to the source 42 through a common connector 58. The circuit through the connector 58 is adapted to be broken by a switch 59 operated from the motor 53 at some predetermined point in the travel of the arms 43, 45 and contact structure 44 toward the initial position and to maintain the circuit open until the contact structure 44 has returned to the starting position, and is again starting to move toward the arms 43 and 45. Accordingly, regardless of the fact that the contact arm 45 may remain in engagement with the contact structure 44 during a portion of its quick return, the field 41 will be deenergized and the indicator 37 remain stationary.

Certain structure disclosed in Fig. 4 is disclosed and claimed in the copending application of Clarence Johnson Ser. No. 30,057.

It will be observed that the arm 37 records on the chart 39 in terms of average speed of the meters 4, 27 or in terms of time of detention of the fluid within the section 30, or in terms of velocity of the fluid through the section 30.

I indicate at 60 the bulb of a gas-filled thermometer system, to which the Bourdon tube 62 is connected by the capillary 61. The action is such that variations in temperature of the fluid passing through the conduit 1 will be manifested by movement of the free end of the Bourdon tube 62 adapted to position a link 63.

The link 63 is pivotally connected to one end of a beam 65 carrying a recording pointer 66 adapted to record on the chart 67. The other end of the beam 65 is pivotally connected to a link 64 positioned by the motor 37A with the pointer 37 and therefore the link 64 assumes a position representative of time of detention or velocity of the fluid in the path 30. Assuming that the temperature remains constant and the Bourdon tube 62 stationary, then the beam 65 pivots around the lower end of the link 63 and the indicator 66 moves across the chart 67 directly according to time of detention. If, however, the temperature varies, then the beam 65 moves not only according to time, but according to temperature as well, and the record on the chart 67 is one of interrelation between time and temperature.

From an observation of the value of average speed of the meters 4, 27, or of time of detention of the fluid within the section 30, or of velocity of the fluid through the section 30, or of the time-temperature relation of the fluid, I may so adjust the valve 68 and/or the valve 69 that optimum operating, treating, or processing may be attained.

In addition to the various records and indications of density, mean density, time of detention, and time-temperature relation, I contemplate that the movement of the various elements giving such indications or records may be adapted to actuate or position control devices effective in varying the rate of flow of the fluid or in controlling or varying the treatment which, in the examples explained herein, is a heating of the fluid.

Figure 5:
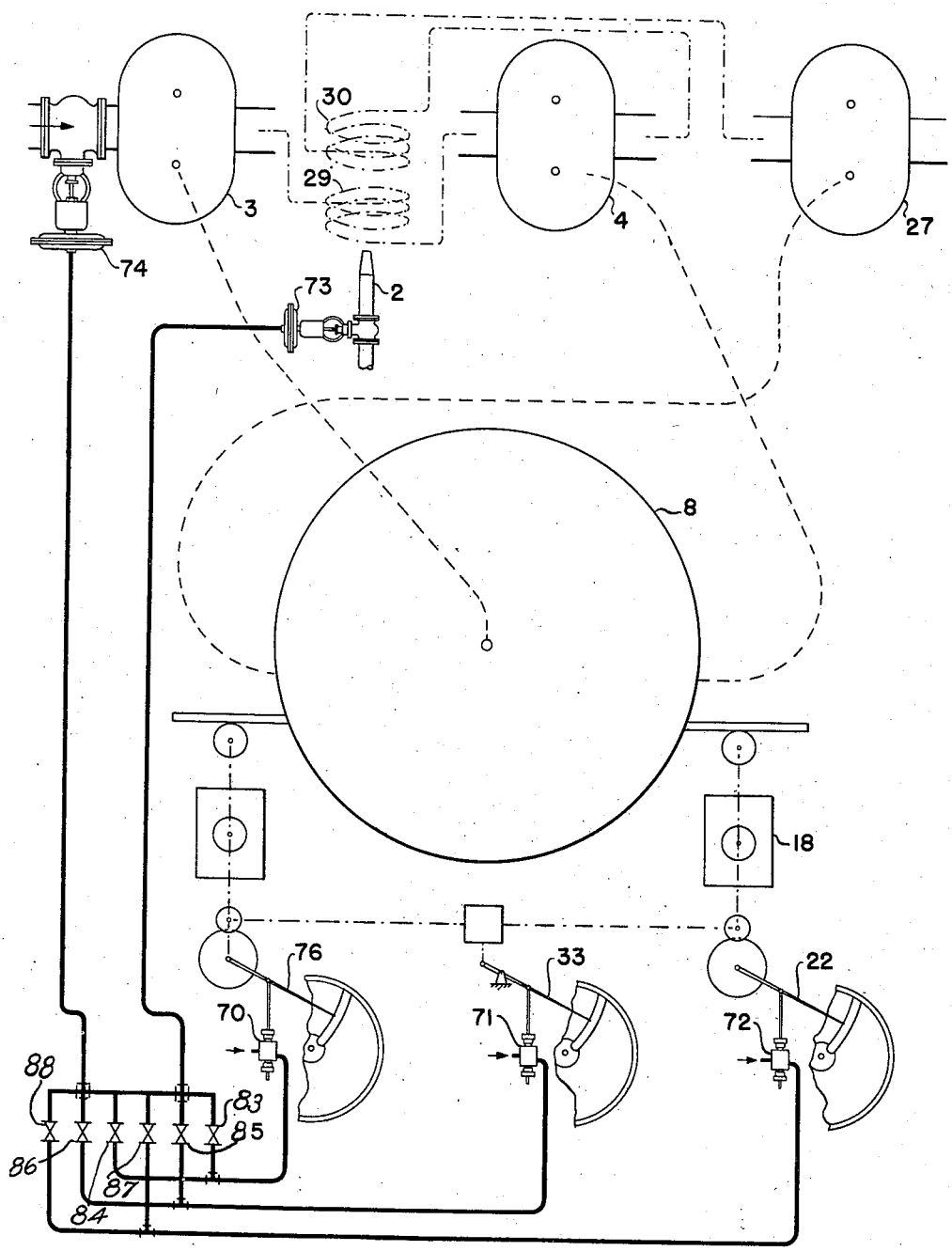
Fig. 5 is a diagrammatic arrangement of the invention (similar to Fig. 3) wherein control arrangements are illustrated.

Fig. 5, for example, is patterned after Fig. 3 but is additionally arranged so that the rate of supply of fluid to the treating system and/or the rate of treatment may be automatically adjusted responsive to the value of density or mean density. Pointer 22 representative of density at meter 4 is arranged to position a pilot valve 72; pointer 76 representative of density at meter 27 is arranged to position a pilot valve 70; and pointer 33 representative of mean density through the conversion section 30 is arranged to position a pilot valve 71. The pilot valves 70, 71, 72 may be of the type disclosed and claimed in the Johnson Patent 2,054,464 and establish air loading pressures representative of the variable which is instrumental in positioning them. Such air loading pressures may be selectively applied to position the control valve 73 and/or the control valve 74 for regulating the rate of firing and/or the rate of flow of fluid through the treating system. Hand operable valves 83–88, inclusive, are available for automatically controlling the regulating valves 73, 74 selectively from the pilot valves 70, 71, and 72. For example, the pilot valve 70 establishes an air loading pressure representative of density at location 27 and this is available through the valve 83 to position the fuel control valve 73 or through the agency of hand valve 84 will control the fuel supply valve 74. In like manner the pilot valve 71 is provided with a hand valve 85 in the line to the regulator 73 and a hand valve 86 in the line to the regulator 74. Similarly, the pilot 72 has hand valves 87, 88.

It is thus possible selectively for either the pilot 70, the pilot 71, or the pilot 72 to actuate either the regulator 74 or the regulator 73, or both. Also various combinations of control may be had. For example, the pilot 70 may regulate the fuel valve 73, while the pilot 72 may regulate the rate of charge valve 74. It is not expected, however, that more than one of the valves 83, 85, 87 would be opened at once, nor that more than one of the valves 84, 86, 88 would be opened at once. Thus if the pilot 70, through the valve 83, were controlling the regulator 73, the valves 85 and 87 would be closed.

Such an arrangement allows a selective actuation of the control valve 73 whereby the rate of firing of the unit may be selectively under the control of density at the inlet to the conversion section, density at the outlet from the conversion section, or mean density through the conversion section. In similar manner the rate of charge valve 74 is made selectively available.

Figure 6:
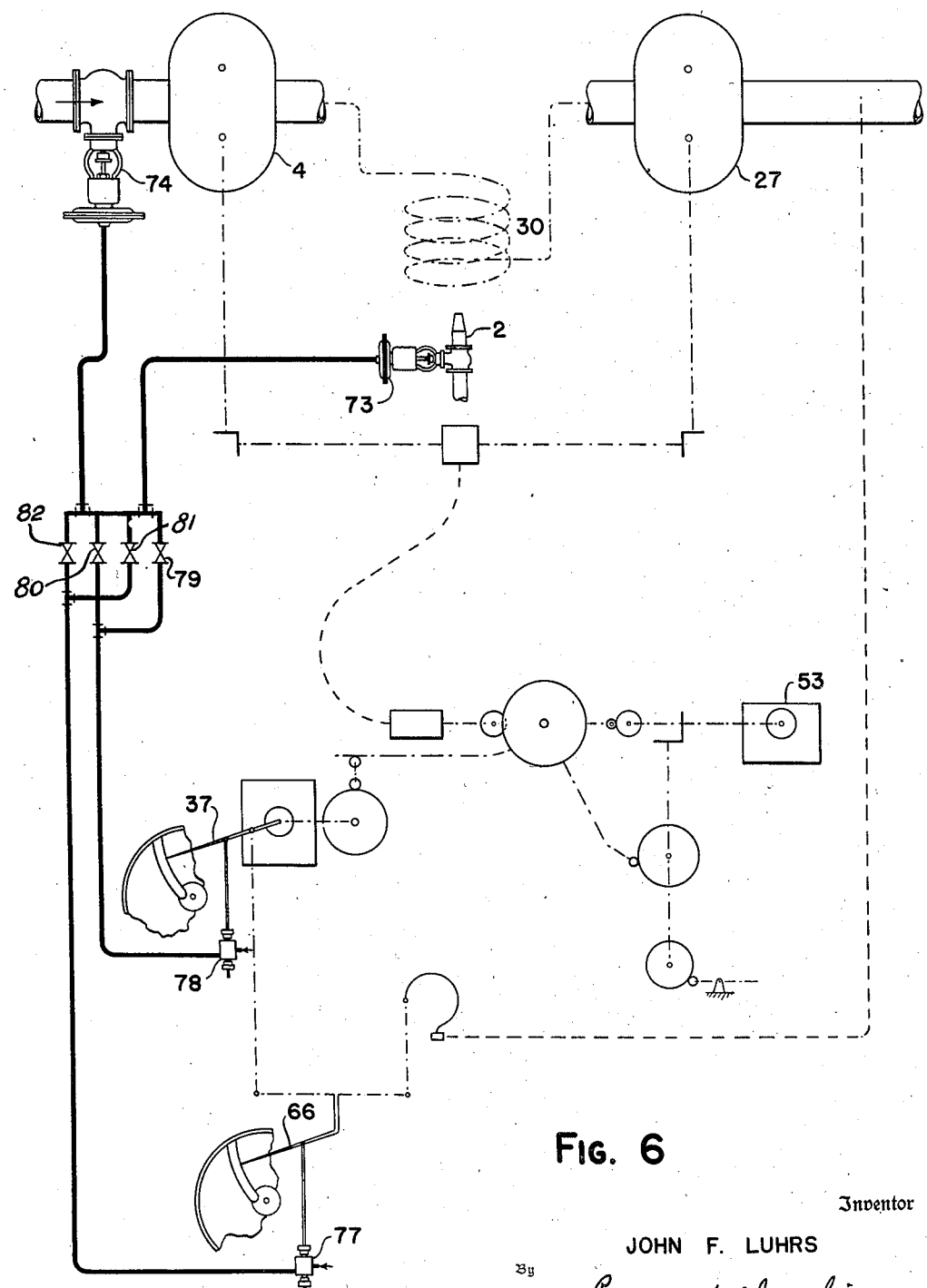
Fig. 6 is a diagrammatic arrangement of the invention (similar to Fig. 4) wherein control arrangements are illustrated.

Fig. 6 is patterned after Fig. 4, but is additionally arranged so that the rate of supply of fluid to the treating system and/or the rate of treatment may be automatically adjusted responsive to the value of the average speed of the meters 4, 27, or of time of detention of the fluid within the section 30, or of velocity of the fluid through the section 30, or of the time-temperature relation of the fluid being treated. The pointer 37 representative of velocity or time of detention is adapted to position the pilot valve 78 establishing a loading pressure representative thereof. The pointer 66 representative of time-temperature relation is adapted to position a pilot 77 in accordance therewith.

The hand actuated valves 79—80 selectively allow the pilot 78 to control the fuel valve 73 or the charge valve 74. In similar manner the hand actuated valves 81, 82 allow the pilot 77 to control the valve 73 or the valve 74. Thus the rate of flow of fluid to be treated and/or the rate of treatment thereof may be automatically controlled responsive to variations in value of velocity, time of detention, or time-temperature relation of the fluid undergoing treatment in the conversion section 30.

While I have chosen to illustrate and describe the functioning of my invention in connection with the heating of petroleum or hydrocarbon oil, it is to be understood that the method and apparatus is equally applicable to the treatment, process, or working of other fluids, such for example as in the vaporization of water to form steam.

While I have utilized density as representative of a condition change of a fluid undergoing treatment, it is to be understood that there are other conditions which may vary with such treatment. Furthermore, that by treatment I do not limit myself to the heating of a fluid, but that this may be a physical and/or chemical treatment resulting in a physical and/or chemical condition change. For example, I believe that the vaporization of water into steam is normally a phyiscal condition change, whereas the treatment of hydrocarbon oil by cracking or polymerization is usually a combination of physical and chemical action. Furthermore, that there are undoubtedly many treatments or processes of fluid which comprise merely a chemical change. In any event, I expect to be limited only as to the claims in view of prior art.

Such methods and apparatus as are not herein claimed are covered in the copending application of Robert L. Rude, Serial No. 152,860.

What I claim as new, and desire to secure by Letters Patent of the United States, is:

1. In combination, a meter rotatable at a speed corresponding to the volumetric rate of flow of a fluid, a second meter rotatable at a speed corresponding to the volumetric rate of flow of the fluid at another location in the fluid flow path whereat the same weight rate of fluid flow exists as at the first mentioned meter, heating means for the flow path intermediate the meter locations, and means under the control of said meters continuously determining the ratio of speed of said meters.

2. Apparatus for determining the density of a selected flowing fluid at a location in the flow path remote from a reference point and wherein the same weight rate of fluid flow exists at both said points, comprising in combination, a first volumetric rate of flow meter at the reference point, a second similar meter at said location, a shaft angularly moved by each of said meters and at a speed proportional to the volume rate of flow through the respective meter, and means for continuously determining the ratio of speed of said shafts.

3. Apparatus for determining the change in density of a flowing fluid undergoing treatment which will affect the density, comprising in combination, a first volumetric flow meter in the fluid flow path ahead of the treatment zone, a second similar meter in the fluid flow path after the treatment zone and where the same weight rate of fluid flow exists as ahead of the treatment zone, and means for continuously determining the ratio of the manifestations of said meters.

4. Apparatus for controlling the processing of a flowing fluid undergoing condition change, comprising in combination, heating means for the flow path, a first volumetric flow meter in the fluid flow path ahead of the heated zone, a second volumetric flow meter in the fluid flow path after the heated zone, means continuously determining the ratio of speed of said meters, and a regulating valve in the flow path ahead of the heating zone and positioned by said means.

5. Apparatus for controlling the processing of a flowing fluid undergoing condition change, comprising in combination, heating means for the flow path, a first volumetric flow meter in the fluid flow path ahead of the heated zone, a second volumetric flow meter in the fluid flow path after the heated zone, means continuously determining the ratio of speed of said meters, and a regulating valve controlling the heating and positioned by said means.

6. Apparatus for controlling the processing of a flowing fluid undergoing condition change, comprising in combination, heating means for the flow path, a first volumetric flow meter in the fluid flow path ahead of the heated zone, a second volumetric flow meter in the fluid flow path after the heated zone, means continuously determining the ratio of speed of said meters, means regulating the weight rate of flow of fluid to be treated, and means regulating the heating, said last two named means jointly positioned by said first means.

7. Apparatus for controlling the processing of a flowing fluid undergoing condition change, comprising in combination, heating means for the flow path, volumetric means for determining the density of the fluid ahead of the heated zone, volumetric means for determining the density of the fluid after the heated zone, mechanical means continuously averaging said density determinations, and means controlled by said mechanical means continuously regulating the heating means.

8. In an apparatus for determining the change in density of a fluid flowing through a conduit between two points in the conduit, in combination, a conduit, a first meter of the volume rate of flow of fluid through the conduit located at a first point in the conduit, a second meter of the volume rate of flow of fluid through the conduit located at a second point in the conduit, a first member rotatable by said first meter at a speed corresponding to the volume rate of flow at the first point, a second member rotatable at a speed corresponding to the volume rate of flow at the second point, and means under the joint control of said members for varying the correspondence between the speed of the first member and the volume rate of flow at the first point to maintain said members at synchronous speeds.

9. In an apparatus for determining the change in density of a fluid flowing through a conduit between two points in the conduit, in combination, a conduit, a first meter of the volume rate of flow of fluid through the conduit located at a first point in the conduit, a second meter of the volume rate of flow of fluid through the conduit located at the second point, a first member rotatable by said first meter at a speed proportional to the volume rate of flow at the first point, a second member rotatable at a speed corresponding to the volume rate of flow at the second point, means under the joint control of said members for varying the proportionality between the speed of the first member and the volume rate of flow at the first point to maintain said members at synchronous speeds, and exhibiting means of the proportionality between the speed of the first member and volume rate of flow at the first point.

10. In an apparatus for determining the density of a fluid flowing through a conduit at a point in the conduit remote from a reference point therein, in combination, a conduit, means for producing rotation of a first member at a speed proportional to the weight rate of fluid flow at the reference point, means for producing rotation of a second member at a speed proportional to the volume rate of fluid flow at a point remote from the reference point, means for varying the proportionality between the speed of the first member and weight rate of flow at the reference point to maintain said members rotating at synchronous speeds, and exhibiting means of the proportion between the weight rate of flow and speed of the first member.

11. Apparatus for determining the ratio between two volume rates of flow, comprising in combination, a disc having a surface revoluble at a speed corresponding to one of the volume rates of flow, a first rotatable member engaging said disc and movable radially thereof rotatable at a speed determined by the speed of the disc and radial position along the disc, a second member rotatable at a speed proportional to the other volume rate of flow, means under the joint control of said members for varying the radial position of the first member to maintain said members at synchronous speeds, and exhibiting means of the radial position of said first member.

12. Apparatus for continuously determining the mean density of a heated flowing mixture of liquid and vapor throughout a portion of its flow path, comprising in combination, means including a volumetric meter for determining the density of the fluid at the inlet to said portion, means including a volumetric meter for determining the density of the fluid at the outlet from said portion, and means operated by the two said density determining means continuously averaging said density determinations.

13. A method of operating a fluid treating system which includes continuously determining the volume rate of flow of the fluid prior to treatment which causes a change in the volume rate of flow, continuously determining the volume rate of flow of the fluid after treatment, continuously determining the ratio of the volume rates of flow determined, and continuously controlling the weight rate of flow of the fluid from such determinations to maintain an optimum ratio between the volume rate of flow prior to treatment and the volume rate of flow after treatment.

14. A method of operating a fluid heating system which includes continuously determining the volume rate of flow of the fluid prior to the heating zone, continuously determining the volume rate of flow of the fluid after heating, continuously determining the ratio of the volume rates of flow determined, and continuously controlling the heating of the fluid from such determinations to maintain an optimum ratio between the volume rate of flow of the fluid prior to the heating zone and the volume rate of flow of the fluid after heating.

15. A method of operating a fluid treating system which includes continuously determining the volume rate of flow of the fluid prior to treatment which causes a change in the volume rate of flow, continuously determining the volume rate of flow of the fluid after treatment, continuously determining the ratio of the volume rates of flow determined, and continuously controlling the treatment of the fluid from such determinations to maintain an optimum ratio between the volume rate of flow prior to treatment and the volume rate of flow after treatment.

16. A method of operating a fluid heating system which includes continuously determining the volume rate of flow of the fluid prior to the heating zone, continuously determining the volume rate of flow of the fluid after heating, continuously determining the ratio of the volume rates of flow determined, and continuously controlling both the weight rate of flow and the heating of the fluid from such determinations to maintain an optimum ratio between the volume rate of flow of the fluid prior to the heating zone and the volume rate of flow of the fluid after heating.

JOHN F. LUHRS.